| United States Patent [19] | [11] Patent Number: 4,879,080 |
| Hsieh | [45] Date of Patent: Nov. 7, 1989 |

[54] HIGH DENSITY SILICON NITRIDE BODIES

[75] Inventor: Martin Y. Hsieh, Palo Alto, Calif.

[73] Assignee: GTE Products Corporation, Stamford, Conn.

[21] Appl. No.: 606,044

[22] Filed: May 2, 1984

[51] Int. Cl.[4] .............................................. C04B 35/44
[52] U.S. Cl. ......................................... 264/63; 501/97
[58] Field of Search ............................. 264/63; 501/97

[56] References Cited

U.S. PATENT DOCUMENTS

| 3,950,464 | 4/1976 | Masuki et al. | 501/97 |
| 3,969,125 | 7/1976 | Komeya | 264/66 |
| 4,211,758 | 7/1980 | Buhrer | 264/66 |
| 4,332,909 | 1/1982 | Nishida et al. | 501/97 |

Primary Examiner—James Derrington
Attorney, Agent, or Firm—Donald R. Castle; James Theodosopoulos

[57] ABSTRACT

A pressureless sintering process is disclosed for producing silicon nitride bodies of near theoretical density from an admixture of silicon nitride and sintering aids of mixtures of lanthanum oxide and aluminum oxide, lanthanum aluminate, and mixtures of lanthanum aluminate and aluminum oxide and mixtures of lanthanum aluminate and lanthanum oxide.

6 Claims, No Drawings

HIGH DENSITY SILICON NITRIDE BODIES

BACKGROUND OF THE INVENTION

This invention relates to a process for producing silicon nitride bodies of near theoretical density. More particularly, it provides a silicon nitride composition from which bodies of near theoretical density can be produced by cold pressing and sintering.

In general, silicon nitride by itself has limited usage. In order to produce materials for turbines, cutting tools, wear parts, and the like, composites are needed which can be pressed to near theoretical density, that is, greater than about 96% of the theoretical density. U.S. Pat. Nos. 3,950,464 and 3,953,221 cite compositions of silicon nitride and sintering aids such as yttria and alumina to aid in densification. However, with the use of yttria the material cannot be cold pressed and sintered to the desired near theoretical density.

The process of this invention involves use of silicon nitride with lanthanum or lanthanum-aluminum compounds which can be cold pressed and sintered to near theoretical density.

SUMMARY OF THE INVENTION

In accordance with one aspect of this invention, there is provided a process whereby an admixture of silicon nitride and sintering aids is formed and then pressed to form a silicon nitride body which is then sintered. The resulting silicon nitride body has near theoretical density.

DETAILED DESCRIPTION OF THE INVENTION

For a better understanding of the present invention together with other and further objects, advantages, and capabilities thereof, reference is made to the following disclosure and appended claims in connection with the foregoing description of some of the aspects of the invention.

The process of this invention consists essentially of forming an admixture of silicon nitride and sintering aids selected from the group consisting of mixtures of lanthanum oxide and aluminum oxide, lanthanum aluminate and mixtures of lanthanum aluminate and aluminum oxide or lanthanum oxide. A typical composition consists essentially of by weight: from about 1.5% to about 30% lanthanum oxide with from about 3.0% to about 27.3% being preferred, from about 0.5% to about 12.0% aluminum oxide with from about 0.5% to about 5.0% being preferred, and the balance silicon nitride. sintering aid can be a mixture of lanthanum oxide m aluminate in a preferred weight ratio of about 1 to 1.

A procedure for forming lanthanum is set forth in U.S. patent application Ser. No. 631,270, attorney's docket No. 83-2-149, file July 16, 1984 and assigned to the same assignee as this application. That patent application is hereby incorporated by reference. Mixtures of the above sintering aids can be used, for example, lanthanum oxide, aluminum oxide and lanthanum aluminate.

The silicon nitride can be any silicon nitride, for example, high purity silicon nitride having a purity of at least about 99.9% such as SN 502 which is made by GTE Products Corporation Chemical and Metallurgical Division An impure silicon nitride sold by Nippon Denko and containing up to about 2% by weight iron, and containing other impurities such as carbon, calcium, and aluminum and their oxides at a level generally below about 2% can be used. A typical composition of Nippon Denko silicon nitride is by weight: from about 0.05% to about 0.25% carbon, from about 0.05% to about 0.25% calcium or calcium oxide, from about 0.05% to about 0.25% aluminum or aluminum oxide, up to about 2% iron or iron oxide, and the balance silicon nitride.

A lanthanum oxide sold by Molycorp, a subsidiary of Union Oil of California under the trade name of Molycorp 5200 can be used. An aluminum oxide supplied by Barkowski International Corporation under the trade name of CR-30 can be used.

The admixture of silicon nitride, the sintering aids and the binder is formed by any conventional method such as ball milling, blending, and the like which will result in a uniform homogeneous mixture. The admixture is then cold pressed to form a green body having a density of from about 60% to about 65% of the theoretical density. The silicon nitride body is then sintered at from about 1225° C. to about 1800° C. with from about 1750° C. to about 1790° C. being preferred. The resulting sintered silicon nitride body has a density equal to at least about 96% of the theoretical density for that particular composition.

To more fully illustrate this invention, the following non-limiting example is presented. All parts, portions, and percentages are on a weight basis unless otherwise stated.

EXAMPLE

Several compositions of relatively impure silicon nitride from Nippon Denko, lanthanum oxide, and aluminum oxide are cold pressed and sintered at about 1780° C. for about 4 hours. The sintered densities are given in the table below with the corresponding theoretical densities.

| Composition | | | | | Percent |
| % $La_2O_3$ | % $Al_2O_3$ | % $Si_3N_4$ | Sintered Density | Theoretical Density | Theoretical Density |
| --- | --- | --- | --- | --- | --- |
| 15 | 5 | 80 | 3.410 | 3.385 | 100.1 |
| 1.5 | 2.5 | 96 | 3.077 | 3.20 | 96.1 |
| 6.0 | 10 | 84 | 3.220 | 3.26 | 98.8 |
| 27.25 | 3.75 | 70 | 3.596 | 3.55 | 101.3 |

The above theoretical densities do not take in to account the impurities in the silicon nitride which accounts for the values of greater than 100% of the theoretical densities.

Comparable results are achieved when pure silicon nitride such as SN 502 is used in place of the impure silicon nitride in this example.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing silicon nitride bodies of near theoretical density said process comprising:
   (a) forming an admixture consisting essentially of silicon nitride and sintering aids selected from the group consisting of lanthanum aluminate, mixtures of lanthanum aluminate and aluminum oxide and mixtures of lanthanum aluminate and lanthanum oxide, and a volatile binder, (b) pressing said admixture to form a green silicon nitride body and, (c) sintering said green silicon nitride body to produce a silicon nitride body having a density of greater than about 96% of the theoretical density.

2. A process according to claim 1 wherein the silicon nitride body has a composition consisting essentially of by weight: from about 1.5% to about 30% of lanthanum oxide, and about 0.5% to about 12.0% of aluminum oxide and the balance silicon nitride.

3. A process according to claim 1 wherein the sintering aid is a mixture of lanthanum oxide and lanthanum aluminate in a weight ratio of about 1 to 1.

4. A process according to claim 1 wherein the sintering aid is lanthahum aluminate.

5. A process according to claim 1 wherein the sintering temperature is from about 1225° C. to about 1800° C.

6. A process according to claim 1 wherein the density of the sintered silicon nitride body is from about 97% to about 100% of the theoretical density.

* * * * *